June 10, 1969   R. L. MOSMAN ET AL   3,448,876
TRUCK FOR GRANULAR MATERIAL
Filed Feb. 23, 1967   Sheet 1 of 3
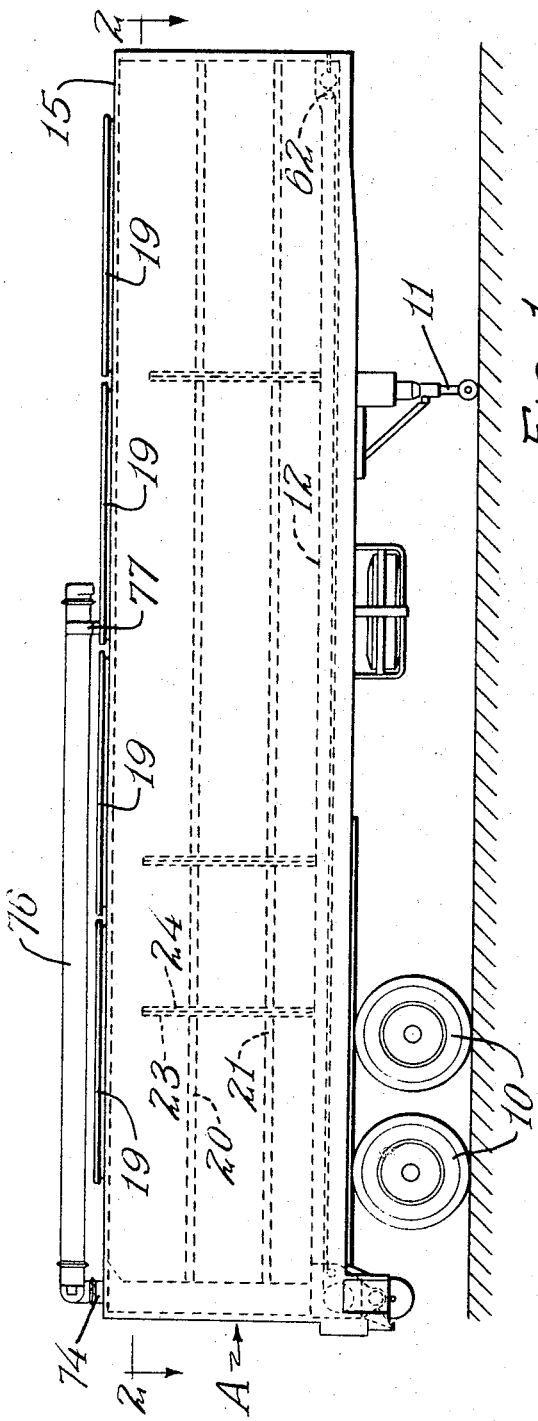
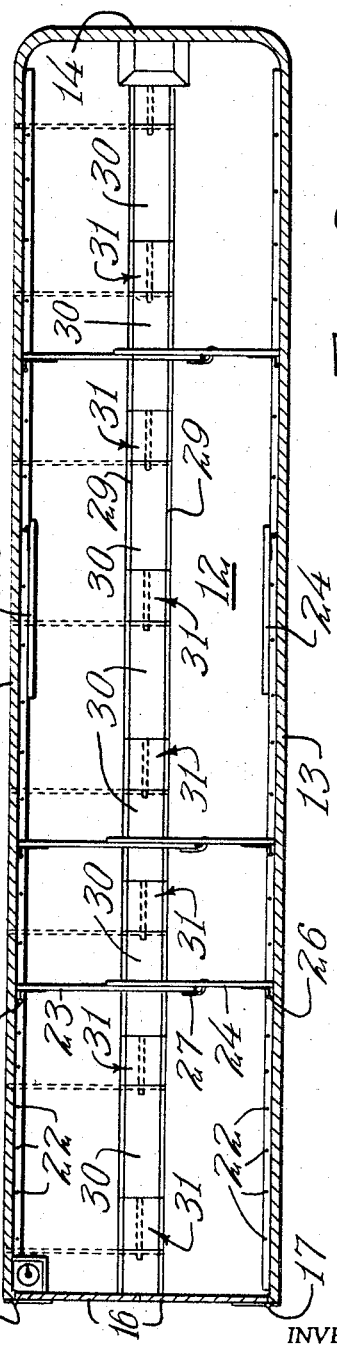
INVENTOR
ROLLAND L. MOSMAN
RONALD H. STROMEN
BY
ATTORNEY

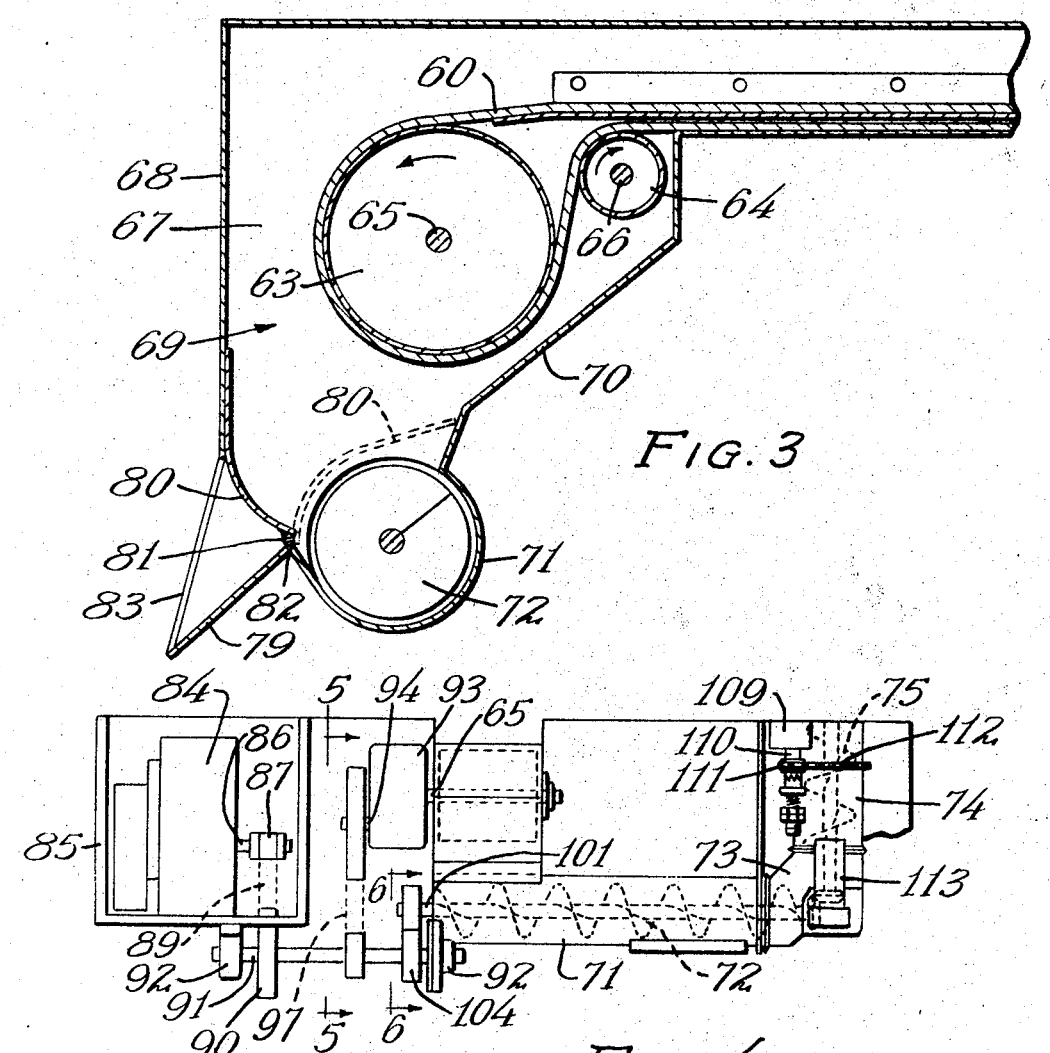

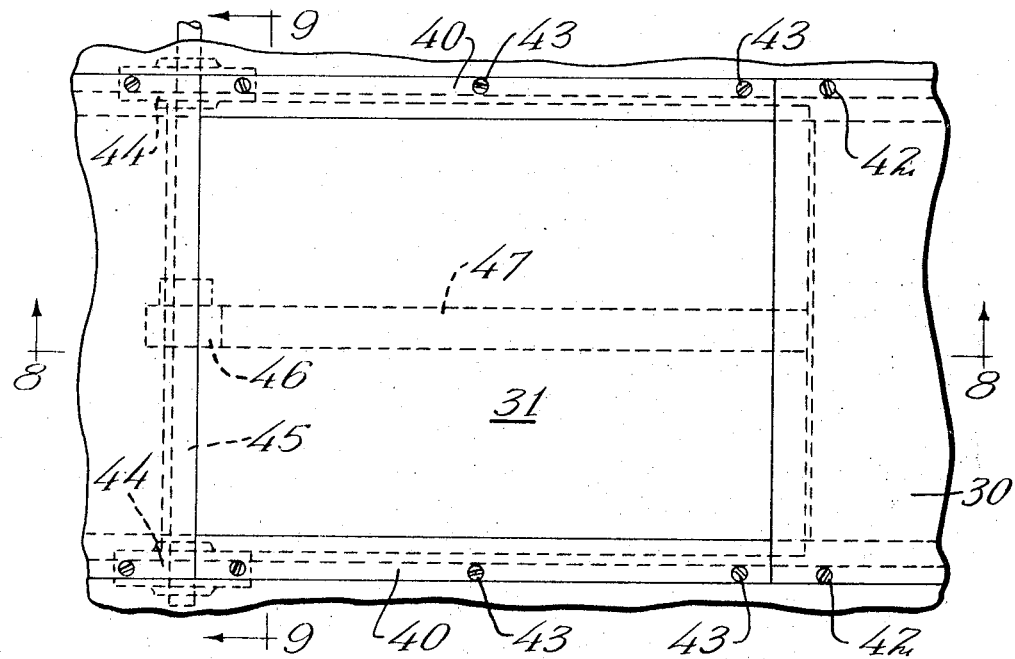

United States Patent Office 3,448,876
Patented June 10, 1969

3,448,876
TRUCK FOR GRANULAR MATERIAL
Rolland L. Mosman, Boone, Iowa 50036, and Ronald H. Stromen, 1214 Arizona Ave., Ames, Iowa 50010
Filed Feb. 23, 1967, Ser. No. 623,494
Int. Cl. B60p 1/36, 1/64
U.S. Cl. 214—83.2                                    8 Claims

ABSTRACT OF THE DISCLOSURE

The invention relates to a truck trailer for granular material such as fowl and animal feed, grain and other fluent materials. The truck is normally filled through hatches in the roof into compartments within the truck body. The compartments are formed by pairs of partition panels hinged to opposite side walls of the truck trailer body and secured in overlapping relation. The hinges are detachably secured to the walls so that the panels may be readily moved from one position to another longitudinally of the walls to vary the compartment size, or the panels may be folded against the wall when not used. The granular material is discharged from the rear of the trailer body by a belt conveyor supported for longitudinal movement beneath the floor of the body. Above the conveyor belt is a series of spaced door openings normally closed by longitudinally slidable doors. The doors may be individually opened or closed from a point outside the trailer body, allowing any portion of the granular material to drop onto the conveyor and be discharged to the rear of the truck, at which point it may be directly discharged, or may be delivered to a discharge pipe through screw conveyors.

---

This invention relates to an improvement for truck for granular material and deals particularly with a truck useful in the hauling of feed for fowl and for animals, as well as for grain and other granular materials.

During recent years it has been common practice to transport granular feed from the mill where it is prepared to various feed dealers for sale to individual customers. Trucks of this type are provided with longitudinally spaced hatches in the roof of the truck trailer body through which the body may be filled. In some instances, longitudinally extending conveyor belts have been provided beneath the floor of the truck by means of which the feed may be carried to an end of the body. The feed is dumped into a hopper equipped with a screw conveyor which delivers the feed to a vertical conveyor which elevates the feed to a point above the top of the truck. From here, the feed is forced through a horizontal conveyor which is pivotally supported about a vertical axis and which may be used to deliver the feed to storage bins and the like. With this arrangement, the trucks may be unloaded with comparative ease.

Certain difficulties have been experienced with existing equipment. In the first place, the longitudinal conveyor belt beneath the truck floor is usually covered by a series of plates which may be removed one at a time as the truck is emptied to permit the granular material to drop onto the conveyor belt. This means that the truck must be emptied from one end, which is usually the rear end, to the front, and requires that an operator be constantly available to remove the cover plates one after the other until the operation is completed. After the truck has been emptied, the cover plates must be replaced before the truck is refilled in order that the weight of the contents will not rest directly upon the longitudinal conveyor belt. Furthermore, it is often desirable to transport feeds of different types in the same truck. By providing partition members across the body of the truck at intervals, the truck body may be divided into a series of compartments, each of which may be filled with a different formula of feed. However, with the constructions which have been in use, it has been necessary to fill the truck in such a manner that the feed which is to be first delivered is positioned in the rearmost compartment, and that the feed which is being delivered to various customers or various bins be located in such a manner that they can be removed in the proper order.

A feature of the present invention resides in the provision of a truck of the type described in which the longitudinally extending conveyor belt is covered by a series of spaced doors which are slidably mounted in the floor, and which may be moved from conveyor belt covering position to an open position. In preferred form, these doors are mounted for slidable movement longitudinally of the conveyor, each door preferably being provided with a longitudinally extending rack which is engaged with a gear mounted upon a horizontal shaft. By rotating the gear, the door may be moved from closed to open position and vice versa. Means are provided externally of the truck for rotating each transverse shaft so that any door or combination of doors throughout the length of the truck may be individually opened or closed from outside the truck.

A further feature of the present invention resides in the provision of a partition structure capable of dividing the body into a series of compartments. The partition means preferably comprises a pair of panels pivotally supported on opposite sides of the truck which may be swung transversely into overlapping relation and secured in this position. The hinges which support the panels are pin-type structures which are supported in apertures in channels or beams extending longitudinally of the truck body on opposite sides thereof. The arrangement is such that the hinges supporting each panel may be lifted out of engagement with the apertures in which they are engaged so that the panels may be moved from one position to another to form compartments of a desired size.

A further feature of the present invention resides in the provision of a structure of the type described in which each of the slidable doors overlying the belt conveyor is provided with a downwardly extending flange at the upstream end of the door. This flange extends downwardly toward the conveyor belt, and acts to limit the depths of material which may be carried by the conveyor belt as it moves toward the end of the truck. As a result, the clogging of the space above the conveyor belt is prevented.

These and other objects and novel features of the present invention will be more clearly and fully set forth in the following specification and claims.

In the drawing forming a part of the specification:
FIGURE 1 is a side elevational view of a truck for granular material, showing the general arrangement of parts.

FIGURE 2 is a horizontal sectional view through the truck body, the position of the section being indicated by the line 2—2 of FIGURE 1.

FIGURE 3 is a vertical sectional view on a longitudinal plane at the rear end of the conveyor belt.

FIGURE 4 is a diagrammatic view showing the drive arrangement for the conveyor belt and the horizontal screw conveyor.

FIGURE 5 is a diagrammatic view taken on the line 5—5 of FIGURE 4, showing the manner in which the drive to the conveyor belt is controlled.

FIGURE 6 is a diagrammatic view on the line 6—6 of FIGURE 4 showing the manner in which the drive to the horizontal screw conveyor is controlled.

FIGURE 7 is an enlarged plan view of a portion of the floor of the truck body, showing one of the movable doors overlying the belt conveyor.

FIGURE 8 is a vertical sectional view through a portion of the conveyor floor, the position of the section being indicated by the line 8—8 of FIGURE 7.

FIGURE 9 is a vertical section through the belt conveyor, the position of the section being indicated by the line 9—9 of FIGURE 7.

FIGURE 10 is a detailed view showing a universal joint connecting portions of the shafts employed for moving the doors.

FIGURE 11 is a sectional detail showing the end of one of the shafts employed for operating the sliding doors.

The trailer truck body is illustrated in general by the letter A. Much of the detail of the construction has been omitted in view of the fact that it is not important to the present invention. In general, the trailer truck body is supported by road engaging wheels 10 conneced to the body in a conventional manner, and not illustrated in the drawings. FIGURE 1 shows the truck trailer body supported at its forward end by a retractable support 11 which supports the body on a generally level keel when the trailer body is not connected to the truck tractor. In general, the truck body is provided with a bottom 12 which is built in a manner which will be later described more in detail. The truck is provided with longitudinal sides 13 which are connected by closed forward end 14 and a top 15. Doors 16 close the rear end of the body, the doors preferably abutting at the center line of the truck, and being supported by hinges such as 17. Suitable locking means are provided for maintaining the doors 16 normally closed.

The top 15 of the truck is provided with a series of longitudinally spaced openings which are not illustrated in detail, and which are normally closed by hatches 19. The hatches 19 may be opened to permit the filling of the truck through the top thereof. The side walls 13 of the truck are provided with a pair of vertically spaced horizontally extending channels 20 and 21 which are provided with spaced vertically aligned apertures 22 through the horizontal flanges thereof. Partition panels 23 and 24 are provided at their outer ends with hinge pins 25 and 26 respectively. The hinge pins 25 and 26 are engageable in any of the vertical apertures 22 in the channels 20 and 21 on either side of the truck body. The partition panels 23 and 24 extend substantially into engagement with the floor 12. However, by lifting a partition panel and disengaging the hinge pins 25 or 26 from the channel apertures 22, the partition panels may be relocated in a desired position along the length of the truck body to form interior compartments of a predetermined size. The partition panels 23 and 24 do not extend the full height of the truck body, as it is not common practice to completely fill the body, an air space being maintained above the cargo.

As will be noted in FIGURE 2 of the drawings, the partition panels 23 and 24 overlap and are secured in overlapped relation by suitable fastening means 27. When not in use, the partition panels 23 and 24 may be folded against the side walls 13 of the truck body as is indicated at the center portion of FIGURE 2.

As indicated in FIGURE 2, the floor 12 is centrally slotted throughout the major portion of its length, the sides of the slot being indicated at 29. The area between the floor edges 29 is closed by a series of spaced fixed plates 30 between which are supported slidable doors 31. This arrangement is indicated diagrammatically in FIGURE 2. The actual construction of this arrangement is somewhat more clearly indicated in FIGURES 7, 8 and 9 of the drawings.

As indicated in FIGURE 9, the inner opposed edges 29 of the central slot in the floor 12 are grooved or rabbetted as indicated at 33. An elongated channel which is indicated in general by the numeral 34 is supported between the slot sides 29 to depend downwardly below the floor 12. The channel 34 includes a bottom or base plate 35, parallel vertical sides 36 extending upwardly therefrom, and outwardly turned flanges 37 resting on the bottom surfaces of the grooves 33. Spacers bars 39 overlie the outer edges of the flanges 37 and support strips 40 which extend longitudinally, and which are of a width substantially equal to the width of the flanges 37. The flanges 37 combine with the spacer strips 39 and covering strips 40 to form inwardly opening opposed channels which accommodate the opposite edges of the top panel 41 of the doors 31. The spacer strips 39 also support the marginal edges of the floor plates 30, the upper surfaces of the floor plates 30 and the strips 40 being substantially flush with the upper surface of the floor 12, while the upper surface of each door panel 41 is at a slightly lower level.

As indicated in FIGURES 7 and 9 of the drawings, the strips 40, the spacer strips 39 and the channel flanges 37 are held in position by longitudinally spaced bolts 43. The floor plates 30 are held in place by similar bolts 42. The top panel 41 of each door 31 is slightly longer than the distance between the end edges of the cover plates 30 so that effective closure is provided.

Bearings 44 are supported by the truck floor 12, to support a transversely extending shaft 45, each shaft being located beneath a corresponding door 31 near the rear end edge thereof. Each such shaft 45 supports a pinion 46 which is in engagement with a rack 47 secured to the undersurface of the top panel 41 of the door 31 near the transverse center thereof. Rotation of the shaft 45 and pinion 46 mounted thereof will cause relative longitudinal movement of the gear rack 47 with which it is engaged, causing longitudinal movement of the door 31. A vertical flange 49 is provided on the end edge of the top panel 41 nearest the forward end of the truck, the flange 49 extending downwardly to approximately the level of the shafts 45. The purpose of this flange is to limit the depth to which the granular material may build up on the longitudinal conveyor belt which will be described.

A series of elongated sleeve bearings 50 having open outer ends are secured to the truck side 13 as indicated at 51, each sleeve bearing being aligned with a corresponding shaft 45. A shaft 52 is supported by each sleeve bearing 50 and is connected to the aligned shaft 45 by a universal connection 53 which compensates for any slight misalignment. A crank pin 54 extends through the axis of the outer end portion of the shaft 52 within the sleeve bearing, and is engageable with the tubular notched end of a crank 55 having a crank handle 56 by means of which it may be rotated. When it is desired to open any of the doors 31, the crank 55 is engaged with the desired shaft 52 and the aligned shafts 52 and 45 are rotated. This rotates the corresponding pinion 46 and moves the rack 47 to open the door 31. The doors are closed by reciprocating the same in the opposite direction.

An inverted channel 57 extends longitudinally of the channel 34, the parallel sides 59 of the channel 57 resting upon the bottom panel 35 of the channel 34. A conveyor belt 60 extends susbtantially throughout the length of the truck body, the upper reach of the conveyor belt being supported by the top panel 61 of the channel 57, and the lower reach of the conveyor belt supported by the base panel 35 of the channel 34. As is indicated in FIGURE 1 of the drawings, a roller 62 is supported upon a transverse longitudinally adjustable axis at the front of the trailer body by which the belt tension is controlled. The rear end of the conveyor belt 60 is directed around a drive pulley or drum 63, and over an idler pulley 64, both of which are supported on parallel transverse shafts 65 and 66 respectively.

The drum 63 and idler pulley 64 are located between the laterally spaced sides 67 of a hopper 69 having an inclined lower wall 70 leading to a substantially horizontal tubular conduit 71. The rear of the hopper is formed by a vertical wall 68. The portion of the conduit 71 between the hopper side walls 67 is open on its upper side so as to receive the material dumped into the hopper 69 by the conveyor belt 60. A horizontal screw conveyor 72 extends axially of the conduit 71 for driving the conveyed material laterally to a rear corner of the truck body. As indicated in FIGURE 4 of the drawings, the outlet end of the conduit 70 is connected by an inclined passage 73 to a vertical conduit 74. The vertical conduit 74 also includes a vertical screw conveyor 75. The upper end of the conduit 74 is indicated in FIGURE 1 of the drawings connected to a discharge pipe 76 which normally rests upon a bracket 77 on the roof 15 of the truck body. This discharge pipe 76 may be swung about to discharge the granular material to a suitable bin or the like. In view of the fact that the discharge system including the vertical screw conveyor and discharge pipe 76 have been produced for some time, and form no part of the present invention, much of the detail construction has been omitted.

The hopper 69 is provided with an extension lip 79 forming, in effect, an extension of the inclined bottom 70 but on the opposite side of the conduit 71. A deflector 80 is hingedly connected at 81 to the juncture between the conduit edge 82 of the conduit 71 and the lip 79. When the deflector 80 is in the position illustrated in full lines in FIGURE 3 of the drawings, the discharge from the belt conveyor 60 drops into the conduit 70 and is moved by the screw conveyor 72. If the deflector 80 is in the position indicated in dotted outline of FIGURE 3, the conveyed product will be discharged over the lip 79 which forms, with the lip sides 83, a discharge spout. This arrangement may be used when the contents of the truck are being directed to a storage area beneath the level of the truck body, or where the contents of the truck are being dumped onto a conveyor located behind the truck body.

FIGURE 4 of the drawings diagrammatically illustrates the operating mechanism for the various conveyors, the view indicating structure beneath the rear of the truck body looking toward the rear of the truck. The view is diagrammatic, as obviously the moving parts are actually enclosed and are not readily visible. FIGURE 4 indicates an engine 84 supported beneath the truck body floor by suitable framework indicated diagrammatically at 85. The engine shaft 86 supports a sheave 87 which is connected by belts 89 to a cooperable sheave 90 on a countershaft 91. The counter-shaft 91 is shown as supported by suitable bearings 92. The drive shaft 65 of the drive pulley 63 of the belt conveyor is shown as extending into a gear reducing unit 93 having an input shaft 94. As diagrammatically illustrated in FIGURE 5 of the drawings, the countershaft 91 is provided with a pulley 95 connected to a cooperable pulley 96 on the gear reduction shaft 94 by belts 97. An idler pulley 99 is mounted upon a parallel movable shaft 100 which is moved by suitable lever means, not illustrated in the drawings, between the position shown in full lines in FIGURE 5 of the drawings, and the position shown in dotted outline therein. When in the position indicated in full lines, the belts are tightened and the rotation of the countershaft 91 is transmitted through the belts 97 to the gear reduction shaft 94. This in turn drives the drive shaft 65 connected to the drive pulley 63 for the conveyor belts 60.

The horizontal screw conveyor 71 is mounted upon a shaft 101 extending above and parallel to the countershaft 91. The countershaft 91 is provided with a pulley 102 connected to an aligned pulley 103 on the screw conveyor shaft 101 by belts 104. An idler pulley 105 is mounted upon a movable shaft 106 which may be moved by suitable lever means or the like, not illustrated in the drawings, from the position shown in full lines in FIGURE 6 to the position shown in dotted lines therein. When in the full line position indicated, the belts 104 are tight and the screw conveyor 72 will be in operation. When in the position shown in dotted outlines in this figure, the belts will be slack and the screw conveyor will remain stationary.

The vertical auger 75 may be connected to the horizontal auger 72 for rotation in unison therewith, or may be driven by a separate drive unit not illustrated in the drawings. FIGURE 4 of the drawings illustrates diagrammatically a gear box 109 which may be used to rotate the vertical auger housing about its vertical axis. The drive shaft 110 of the gear box 109 is provided with a sprocket 111 connected by a chain 112 to the conduit 74. FIGURE 4 also shows diagrammatically a hydraulic pump 113 which may be used to raise the horizontal discharge pipe. As previously indicated, this portion of the structure has not been disclosed in detail in view of the fact that it has been used previously.

The operation of the apparatus is believed obvious from the foregoing description. The feed or similar material is discharged into the truck body through the truck top thereof, if desired, the body of the trailer may be divided into compartments of suitable size if feeds of different types are to be delivered in the same load, or if the feed contained is to be delivered to more than one location. The present construction is such that the contents of any compartment may be unloaded independently of the others.

When the truck trailer arrives at its destination, the driver applies the crank 55 to the end of a shaft 52 communicating with an aligned shaft 45 beneath a predetermined door 31. The shafts are rotated, acting through the pinion 46 and rack 47 to open the door 31. Either before or after this operation, the conveyor belt 60 may be started in motion. This is accomplished by starting the engine 84, and engaging the countershaft 91 with the gear reduction unit 93 driving the pulley drive shaft 65. The feed or similar material is then conveyed by the conveyor belt 60 to the hopper 69 from which it is discharged. If the feed is to be discharged directly from the back of the trailer body, the deflector 80 is put into the dotted outline position indicated in FIGURE 3. If it is to be discharged by the screw conveyors, the deflector 80 is placed in the full line position shown in this figure, and the countershaft 91 is connected to the conveyor shaft 101 to drive the screw conveyor. The discharge pipe 76 is properly positioned to deliver the material to a suitable bin or conveyor system in the usual manner.

As will be indicated in FIGURE 9 of the drawings, flexible wiper strips 114 are secured to the sides 36 of the channel 34 to rest upon the upper surface of the upper reach of the conveyor belt 60. As a result, when material is dropped onto the conveyor belt, it is confined between these wiper strips 114 so as not to extend over the sides of the conveyor belt.

During the conveying operation, the flange 49 on the rear side of each door 31 limits the height of the material being conveyed to prevent overcrowding of the conveyor belt. As a result, the feed is conveyed at a uniform depth until the contents of the portion of the cargo adjoining the open door has been conveyed. When the contents of a certain compartment has been substantially depleted, the operator may shovel or scoop the material on opposite sides of the door onto the conveyor in order to completely empty the compartment. Obviously, the sides of the floor could be inclined, but this is not usually done as it reduces the amount of material which can be transported correspondingly.

I claim:

1. A trailer for use in handling flowable solid materials including a body having a floor, a channel extending longitudinally of said body in said floor, a conveyor belt in said channel movable longitudinally thereof, means connected to said conveyor belt for driving the same, said floor having a series of door openings therein overlying said channel and spaced longitudinally thereof, a series of doors slidably supported beneath said openings for movement from a position closing said door openings to a position in which said door openings are open, and means connected to said doors and extending externally of said body for moving said doors between said positions, and means movable with the door and extending transversely of the conveyor belt and beneath the level of said floor and spaced above said conveyor belt for limiting the depth of the material conveyed by said conveyor belt to substantially below the level of the floor.

2. The structure of claim 1 and in which said doors are supported for slidable movement longitudinally of said channel.

3. The structure of claim 2 and in which said doors are on a common plane and include a gear rack on the undersurface thereof extending longitudinally of said channel, and a pinion above said conveyor belt engaging each rack and supported upon a shaft which comprises the means for moving said doors.

4. The structure of claim 1 and including adjustable partition means in said body operable to divide the body into a plurality of compartments, said compartments being foldable from a transverse overlapping relation to a position against the side walls of said body.

5. The structure of claim 2 and including a downwardly extending flange on an end of each said door extening toward said belt and terminating above said belt to limit the depth of said material conveyed on said conveyor belt.

6. A trailer for use in handling flowable solid materials including a body having a floor, a channel extending longitudinally of said body in said floor, a conveyor belt in said channel movable longitudinally thereof, means connected to said conveyor belt for driving the same, said floor having a series of door openings therein overlying said channel and spaced longitudinally thereof, a series of door slidably supported beneath said openings for movements from a position closing said door openings to a position in which said door openings are open, and means connected to said doors and extending externally of said body for moving said doors between said positions, said doors being supported for slidable movement longitudinally of said channel, and a downwardly extending flange on an end of each said door extending toward said belt and terminating above said belt to limit the depth of material conveyed on said conveyor belt.

7. A trailer for use in handling flowable solid materials, the trailer including a trailer body having a floor, a channel extending longitudinally of the floor substantially centrally thereof, said channel including a bottom panel and two side panels suspended below the floor of said body, the floor having a series of longitudinally spaced door openings therein communicating with said channel, doors slidably supported for movement longitudinal of said channel and movable from a door opening closing position to a door opening open position, a gear rack secured to the undersurface of each said door, a shaft extending transversely across said channel beneath an end of each said door, a pinion on each said shaft engaging the corresponding rack, said shafts extending beneath said floor externally of said body for manual rotation, rotation of any said shaft acting to open or close the associated door, said doors moving in the direction of the conveyor belt in going toward open position, and a downwardly extending flange on the upstream edge of each door to limit the depth of material carried on said conveyor.

8. A power unit for use in conjunction with a trailer body including a floor, a belt conveyor extending longitudinally of said floor to move material within said trailer body to an end thereof, a drive pulley supporting one end of said belt conveyor at said one end of said body an pulley means supporting said belt conveyor adjoining the opposite end thereof, a hopper extending beneath said conveyor at said one end of said body, and a transversely extending screw conveyor extending into said hopper, a drive pulley shaft secured for rotation beneath said floor, and a screw conveyor shaft parallel to said pulley shaft, a gear reduction unit connected to said pulley shaft and having an input shaft parallel to said previously described shafts, the unit including an engine having its shaft parallel to said previously mentioned shafts, a counter-shaft supported with its axis parallel to, and spaced from, said previously described shafts, means connecting said engine shaft and said counter-shaft for rotation in unison, aligned sheaves mounted on said counter-shaft and on said input shaft, belt means connecting said sheaves, an idler sheave engageable with said belt means and means movably supporting said idler sheave for movement from belt means tightening position to a position in which said belt means is sufficiently loose to slip, aligned screw conveyor sheaves on said counter-shaft and on said screw conveyor shaft, screw conveyor belt means connecting said last named sheaves, a second idler sheave engageable with said screw conveyor belt means, means movably supporting said second idler sheave for movement from a screw conveyor belt means tightening position to a position in which said screw conveyor belt means is sufficiently loose to slip, and means secured to each of said idler sheaves to selectively move them between their positions.

References Cited

UNITED STATES PATENTS

| | | | |
|---|---|---|---|
| 2,300,753 | 11/1942 | Wagner et al. | 214—83.2 |
| 2,585,169 | 2/1952 | Potter | 214—83.2 X |
| 2,697,631 | 12/1954 | Miller | 105—376 X |
| 2,816,797 | 12/1957 | Hanson | 214—83.2 X |
| 2,837,228 | 6/1958 | Kaster | 214—83.18 |
| 3,024,932 | 3/1962 | Dodgen. | |
| 3,107,804 | 10/1963 | Cox | 214—522 |
| 3,278,056 | 10/1966 | Beucler et al. | 214—83.2 |

ALBERT J. MAKAY, Primary Examiner.

U.S. Cl. X.R.

214—83.36, 519